United States Patent
Shanmugaraj et al.

(10) Patent No.: US 12,097,839 B2
(45) Date of Patent: Sep. 24, 2024

(54) DEVICE FOR DETERMINING LANE TYPE AND METHOD THEREOF

(71) Applicant: MANDO CORPORATION, Pyeongtaek-si (KR)

(72) Inventors: M. Shanmugaraj, Pyeongtaek-si (KR); Shubham Jain, Pyeongtaek-si (KR); Jitesh Kumar Singh, Pyeongtaek-si (KR); Arpit Awasthi, Pyeongtaek-si (KR)

(73) Assignee: HL MANDO CORPORATION, Pyeongtaek (KR)

( * ) Notice: Subject to any disclaimer, the term of this patent is extended or adjusted under 35 U.S.C. 154(b) by 559 days.

(21) Appl. No.: 17/314,121

(22) Filed: May 7, 2021

(65) Prior Publication Data

US 2021/0350148 A1    Nov. 11, 2021

(30) Foreign Application Priority Data

May 8, 2020    (KR) ......................... 10-2020-0054870

(51) Int. Cl.
*G06K 9/00* (2022.01)
*B60W 10/18* (2012.01)
(Continued)

(52) U.S. Cl.
CPC .......... *B60W 10/18* (2013.01); *B60W 30/143* (2013.01); *B60W 40/06* (2013.01); *G06F 18/24* (2023.01); *G06V 10/70* (2022.01); *G06V 20/588* (2022.01); *B60W 2552/05* (2020.02); *B60W 2552/53* (2020.02); *B60W 2555/20* (2020.02); *B60W 2556/50* (2020.02)

(58) Field of Classification Search
CPC .... B60W 10/18; B60W 30/143; B60W 40/06; B60W 2552/05; B60W 2552/53; B60W 2555/20; B60W 2556/60; G06F 18/24; G06V 10/70; G06V 20/588
USPC .......................................................... 382/104
See application file for complete search history.

(56) References Cited

U.S. PATENT DOCUMENTS 11,151,192 B1 * 10/2021 Campbell ............... G06V 20/58
11,250,054 B1 *  2/2022 Campbell ............. G06V 20/582

FOREIGN PATENT DOCUMENTS

KR    10-2018-0137905 A    12/2018

OTHER PUBLICATIONS

Deng, Liuyuan, et al. "Semantic segmentation-based lane-level localization using around view monitoring system." IEEE Sensors Journal 19.21 (2019): 10077-10086. (Year: 2019).*

(Continued)

*Primary Examiner* — Jonathan S Lee
(74) *Attorney, Agent, or Firm* — Harvest IP Law, LLP

(57) ABSTRACT

A device for determining lane type and method thereof are provided. The device for determining lane type according to an embodiment of the present disclosure includes a camera for acquiring an around view image around a vehicle, a GPS receiver for receiving GPS information, and a controller communicatively connected to the camera and the GPS receiver. Here, the controller is configured to recognize a scene of the image acquired by the camera, detect lanes and road markings from the recognized scene, comprise a classifier adapted based on the GPS information, classify the detected lanes and road markings by the classifier, and confirm a type of the classified lanes.

20 Claims, 5 Drawing Sheets

(51) Int. Cl.
*B60W 30/14* (2006.01)
*B60W 40/06* (2012.01)
*G06F 18/24* (2023.01)
*G06V 10/70* (2022.01)
*G06V 20/56* (2022.01)

(56) References Cited

OTHER PUBLICATIONS

Hu, Xuemin, et al. "Dynamic path planning for autonomous driving on various roads with avoidance of static and moving obstacles." Mechanical systems and signal processing 100 (2018): 482-500. (Year: 2018).*

Zhang, Wenhui, and Tejas Mahale. "End to end video segmentation for driving: Lane detection for autonomous car." arXiv preprint arXiv:1812.05914 (2018). (Year: 2018).*

Seeger, Christoph, et al. "Towards road type classification with occupancy grids." IVS Workshop. Vol. 2. 2016. (Year: 2016).*

De Paula, Mauricio Braga, and Claudio Rosito Jung. "Real-time detection and classification of road lane markings." 2013 XXVI conference on graphics, patterns and images. IEEE, 2013. (Year: 2013).*

Bhandari, Ravi, et al. "Driving lane detection on smartphones using deep neural networks." ACM Transactions on Sensor Networks (TOSN) 16.1 (2020): 1-22. (Year: 2020).*

Fang, Yong. Road scene perception based on fisheye camera, LIDAR and GPS data combination. Diss. Université de Technologie de Belfort-Montbeliard, 2015. (Year: 2015).*

* cited by examiner (a)

(b)

(c)

(d)

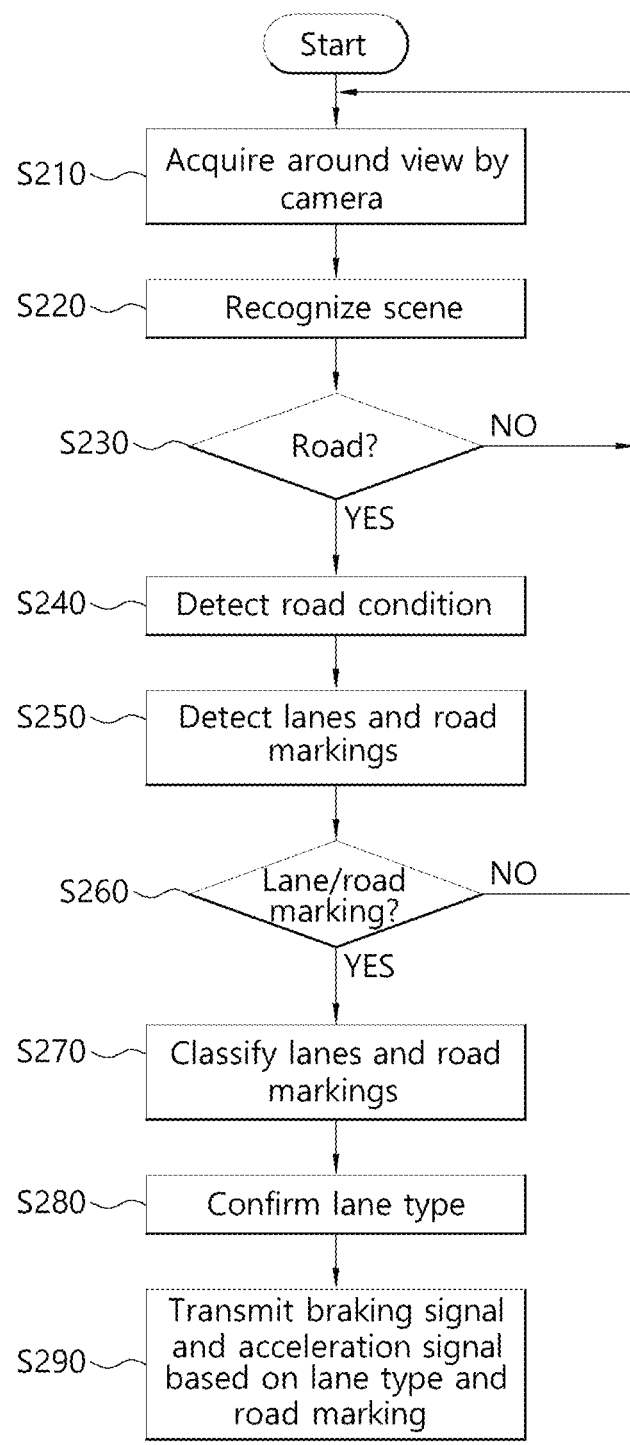

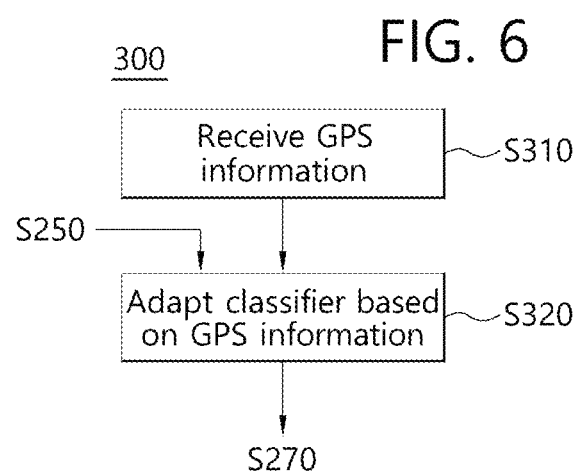

DEVICE FOR DETERMINING LANE TYPE AND METHOD THEREOF

CROSS-REFERENCE TO RELATED APPLICATION

This application claims priority to and the benefit of Korean Patent Application No. 10-2020-0054870, filed on May 8, 2020, the disclosure of which is incorporated herein by reference in its entirety.

BACKGROUND

1. Field of the Invention

The present disclosure relates to a device for determining lane type and method thereof.

2. Discussion of Related Art

In general, the first step to robust autonomous driving is to recognize and understand the environment around objects. However, simply recognizing obstacles and understanding the geometry around the vehicle is not enough. Because there are traffic regulations based on traffic symbols such as lanes and road markings that must be observed, recognition of them is required. In addition, algorithms that can be applied to autonomous driving should be robust and performed in real time in various environments.

However, until now, research on the detection of lanes and road markings is limited to places where the weather is good. In addition, the lane and road marking detection algorithm is based on learning about a specific area. Therefore, detection of lanes and road markings for autonomous driving is limited to local and driving conditions.

The above information disclosed in this Background section is only for enhancement of understanding of the background of the disclosure and it may therefore contain information that does not form the prior art that is already known to a person of ordinary skill in the art.

SUMMARY OF THE INVENTION

An embodiment of the present disclosure is directed to providing a device for determining lane type and method thereof that can be applied to an autonomous vehicle independently of a region or country by adapting a region-based classifier using an around view.

The technical problems to be solved in the present disclosure are not limited to the technical problems mentioned above, and other technical problems not mentioned will be clearly understood by those of ordinary skill in the art from the following description.

According to an aspect of the present disclosure, there is provided a device for determining lane type, including a camera for acquiring an around view image around a vehicle, a GPS receiver for receiving GPS information, and a controller communicatively connected to the camera and the GPS receiver, the controller being configured to recognize a scene of the image acquired by the camera, detect lanes and road markings from the recognized scene, comprise a classifier adapted based on the GPS information, classify the detected lanes and road markings by the classifier, and confirm a type of the classified lanes.

In an embodiment, the controller may be configured to adapt the classifier based on the GPS information by inputting the detected lanes and road markings.

In an embodiment, the controller may be configured to transmit a braking signal and an acceleration signal to a corresponding ECU based on the type of lanes and road markings.

In an embodiment, the controller may be configured to classify the detected lanes into one of a dotted line, a solid line and a combination thereof.

In an embodiment, the controller may be configured to search for a color of the detected lanes.

In an embodiment, the controller may be configured to detect roads and other objects from the image.

In an embodiment, the controller may be configured to recognize whether the road is a highway or a downtown road according to the detected roads and other objects.

In an embodiment, the controller may be configured to determine whether a road is contained in the recognized scene, and if the recognized scene contains a road, detect a condition of the road.

In an embodiment, the controller may be configured to detect at least one of snow, water, fallen leaves, and mud on the road.

In an embodiment, the camera may be a fisheye camera.

In an embodiment, there is provided a method for determining lane type, including: acquiring, by a camera, an around view image around a vehicle; recognizing a scene of the acquired image; detecting lanes and road markings from the recognized scene; classifying, by a classifier adapted based on GPS information, the detected lanes and road markings; confirming a type of the classified lanes.

In an embodiment, the method for determining lane type may further include receiving GPS information; and adapting the classifier based on the GPS information by inputting the detected lanes and road markings.

In an embodiment, the method for determining lane type may further include transmitting a braking signal and an acceleration signal to a corresponding ECU based on the type of lanes and road markings.

In an embodiment, the classifying the lanes and road markings may include classifying the detected lanes into one of a dotted line, a solid line and a combination thereof.

In an embodiment, the confirming the type of the lanes may include searching for a color of the detected lanes.

In an embodiment, the recognizing the scene may include detecting roads and other objects from the image.

In an embodiment, the recognizing the scene may include recognizing whether the road is a highway or a downtown road according to the detected road and other objects.

In an embodiment, the method for determining lane type may further include determining whether a road is contained in the recognized scene, and if the recognized scene contains a road, detecting a condition of the road.

In an embodiment, the detecting the condition of the road may include detecting at least one of snow, water, fallen leaves, and mud on the road.

In an embodiment, the acquiring the image may include acquiring the image by using a fisheye camera.

Since the device for determining lane type and method thereof according to an embodiment of the present disclosure can be applied to an autonomous vehicle independently of a region or country by adapting the classifier based on regional information, there is no need to provide a separate algorithm for each country or region.

In addition, the present disclosure can accurately detect surrounding conditions by detecting roads, road conditions, lane types, and road markings using the around view, thereby avoiding environment limitations.

In addition, since the present disclosure can control the vehicle during high-speed driving by providing a braking signal and an acceleration signal according to a lane type, a road marking, and a road condition, it can be effectively used for a real-time autonomous vehicle.

BRIEF DESCRIPTION OF THE DRAWINGS

The above and other aspects, features, and advantages of the present disclosure will become more apparent to those of ordinary skill in the art by describing embodiments thereof in detail with reference to the accompanying drawings, in which:

FIG. 5 is a flowchart of a method for determining lane type according to an exemplary embodiment of the present disclosure;

FIG. 6 is a flowchart showing a procedure for adapting a classifier in a method for determining lane type according to an exemplary embodiment of the present disclosure.

DETAILED DESCRIPTION OF THE EMBODIMENTS

Figure 1:
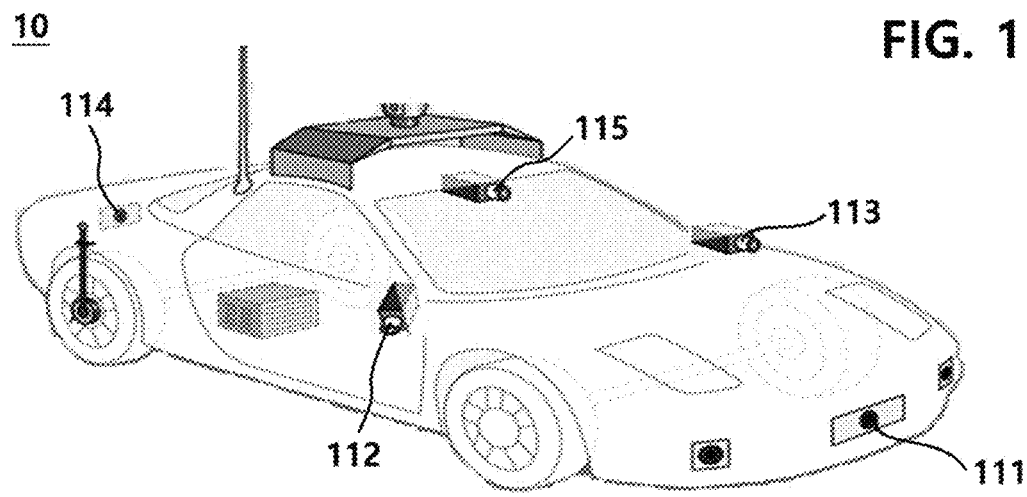
FIG. 1 is a perspective view of a vehicle equipped with a device for determining lane type according to an exemplary embodiment of the present disclosure.

Hereinafter, exemplary embodiments of the present disclosure will be described in detail so that those of ordinary skill in the art can readily implement the present disclosure with reference to the accompanying drawings. The present disclosure may be embodied in many different forms and are not limited to the embodiments set forth herein. In the drawings, parts unrelated to the description are omitted for clarity. Throughout the specification, like reference numerals denote like elements.

Embodiments of the present disclosure are provided to describe the present disclosure more fully to those skilled in the art, the embodiments described below can be modified into various other forms, and the scope of the present disclosure is not limited to the following embodiments. Rather, these embodiments make the disclosure more meaningful and complete and are provided for fully conveying the concept of the disclosure to those of ordinary skill in the art.

FIG. 1 is a perspective view of a vehicle equipped with a device for determining lane type according to an exemplary embodiment of the present disclosure.

Referring to FIG. 1, a vehicle 10 having a device for determining lane type according to an embodiment of the present disclosure may be an autonomous vehicle. That is, while driving on the road, the vehicle 10 may recognize the condition of the road and autonomously control the driving according to the road condition.

To this end, the vehicle 10 may include a plurality of cameras. For example, the vehicle 10 may include a front camera 111, a right side camera 112, a left side camera 113, and a rear camera 114. Here, the front camera 111 may be provided on the front bumper of the vehicle 10. The right side camera 112 and the left side camera 113 may be provided in the left and right side mirrors of the vehicle 10 or in the vicinity thereof. The rear camera 114 may be provided on the rear bumper of the vehicle 10. Accordingly, the vehicle 10 may acquire an around view image around the vehicle.

In addition, the vehicle 10 may further include a video camera 115. Here, the video camera 115 may be provided on the upper part of the interior of the vehicle 10. For example, the video camera 115 may be a recording camera of a black box.

The device for determining lane type 100 according to an embodiment of the present disclosure is for satisfying the main requirements of the autonomous vehicle 10 in order to drive on the road based on lanes and road markings information.

Figure 2:
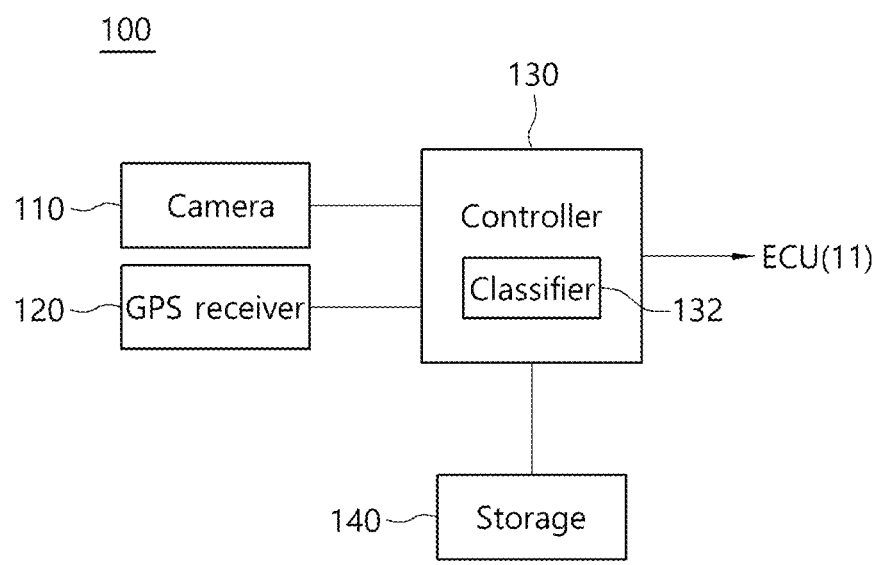
FIG. 2 is a block diagram of a device for determining lane type according to an exemplary embodiment of the present disclosure.

FIG. 2 is a block diagram of a device for determining lane type according to an exemplary embodiment of the present disclosure.

Referring to FIG. 2, the device for determining lane type 100 according to an embodiment of the present disclosure includes a camera 110, a GPS receiver 120, a controller 130, and a storage 140.

The camera 110 may acquire an around view image around the vehicle 10. For example, the camera 110 may include a front camera 111, a right side camera 112, a left side camera 113, and a rear camera 114, as shown in FIG. 1. In this case, the camera 110 may be a fisheye camera.

The GPS receiver 120 may receive GPS information from a GPS satellite. Here, the GPS information may include topography and road information according to the current location of the vehicle 10. In addition, the GPS receiver 120 may store received GPS information in the storage 140.

The controller 130 may be communicatively connected to the camera 110, the GPS receiver 120, the storage 140. Here, the controller 130 may be an ECU of the vehicle 10. Optionally, the controller 130 may be a controller separately equipped to determine the lane type. In this case, the controller 130 may be communicatively connected to an ECU 11 that controls the autonomous driving of the vehicle 10.

The controller 130 may be configured to recognize a scene of the around view image acquired by the camera 110. Here, the controller 130 may be configured to detect a road and other object from the acquired around view image. That is, the controller 130 may detect an object capable of recognizing a road condition from the around view image. In this case, the controller 130 may be configured to recognize whether the detected road is a highway or a downtown road according to the road and other object detected from the around view image.

Accordingly, since the device for determining lane type 100 can accurately detect the road on which the vehicle 10 is running and objects around the vehicle 10, it is possible to provide road information to the autonomous vehicle without being limited to the environment.

The controller 130 may be configured to determine whether a road is contained in the scene recognized from the around view image. If the recognized scene does not contain a road, the controller 130 may be configured to perform recognition on a next around view image without processing the scene.

In this case, if the recognized scene contains a road, the controller 130 may be configured to detect a road condition. The controller 130 may detect the road condition by additionally detecting objects on the road. For example, the controller 130 may be configured to detect at least one of snow, water, fallen leaves, and mud on a road. That is, the controller 130 may be configured to detect road surface condition on a road.

Accordingly, since the device for determining lane type 100 can effectively and quickly detect the road on which the vehicle 10 is running and a dangerous condition of the road, it is possible to provide assistance for the navigation of the autonomous vehicle.

The controller 130 may be configured to detect lanes and road markings from the recognized scene of the around view image. For example, the controller 130 may be configured to detect lanes and road markings by edge detection.

The controller 130 may include a classifier 132 for determining a lane type. Here, the classifier 132 may be adapted based on GPS information received from the GPS receiver 120. In this case, the controller 130 may be configured to adapt the classifier 132 based on GPS information from the GPS receiver 120 by inputting the lanes and road markings detected from the around view image.

Accordingly, the device for determining lane type 100 may be independently applied in all countries and regions without limited to a country or a specific region since it does not require a separate algorithm for a country or a specific region. Moreover, since the device for determining lane type 100 has low computational complexity and can perform the classification of lanes and road markings without hassle, it can be applied to a real-time autonomous vehicle.

The controller 130 may be configured to classify lanes and road markings detected from the around view image by the classifier 132. In this case, the controller 130 may be configured to classify the lanes detected from the around view image into one of a dotted line, a solid line, and a combination thereof according to a shape thereof.

The controller 130 may be configured to confirm a type of the classified lane. In this case, the controller 130 may be configured to search for a color of the lane detected from the around view image.

As a result, the controller 130 may be configured to determine the type of the corresponding lane according to the shape and color of the lane recognized from the around view image. Here, each lane type has a different meaning. Through this, the controller 130 may provide information necessary for driving of the vehicle 10 to the ECU 11.

For example, the controller 130 may be configured to transmit a braking signal and an acceleration signal to a corresponding ECU 11 based on the confirmed type of lane and road markings. Here, the ECU 11 may be configured to control autonomous driving of the vehicle 10. Optionally, the controller 130 may be configured to determine whether to maintain the braking signal and the acceleration signal based on the condition of the road.

Accordingly, since the device for determining lane type 100 may control the vehicle 10 according to the lane type, road markings, and road conditions even during high-speed driving, it is possible to support to ensure the stability of autonomous driving according to a real-time scenario.

The storage 140 may store map information of a navigation system. In addition, the storage 140 may store GPS information received from the GPS receiver 120.

As described above, the device for determining lane type 100 according to an embodiment of the present disclosure may perform to recognize a scene, detect road danger (condition), and detect and classify lane type and road marking with one device.

Figure 3:
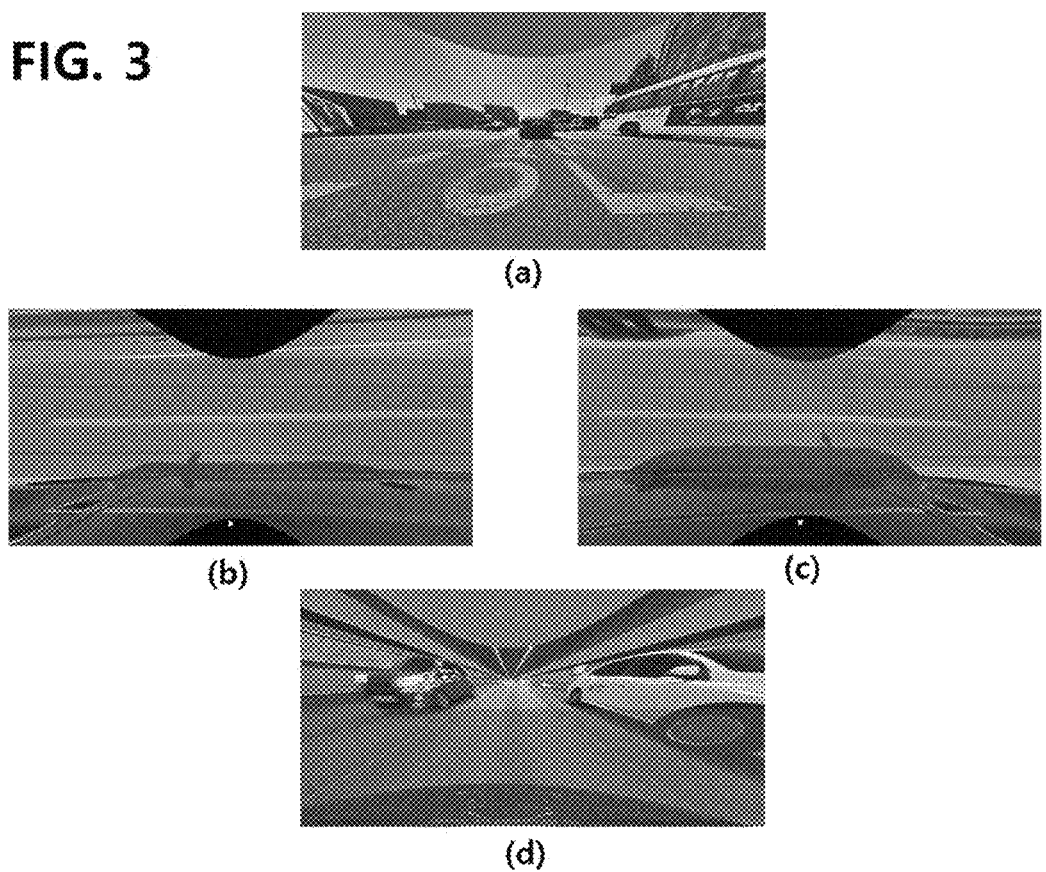
FIG. 3 is an image showing a scene recognition result in a device for determining lane type according to an exemplary embodiment of the present disclosure.
Figure 4:
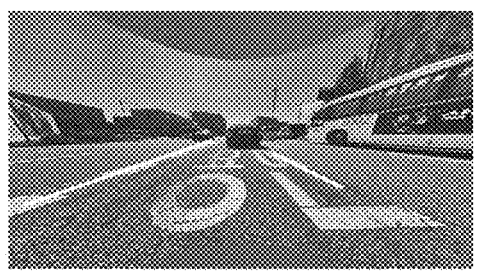
FIG. 4 is an image showing a result of determining a lane type in a device for determining lane type according to an exemplary embodiment of the present disclosure.
Figure 4:
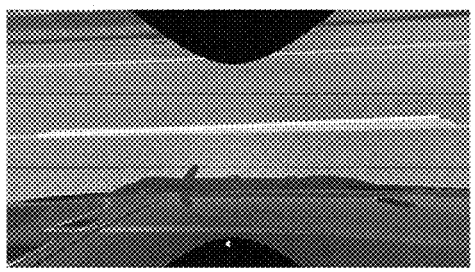
Figure 4:
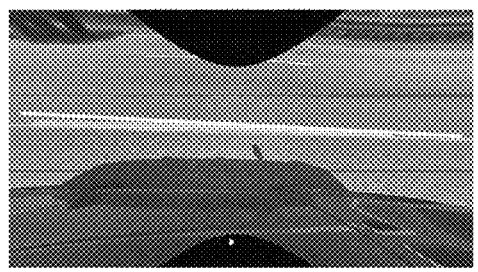
Figure 4:
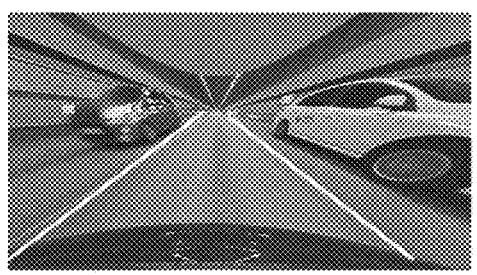

FIG. 3 is an image showing a scene recognition result in a device for determining lane type according to an exemplary embodiment of the present disclosure, and FIG. 4 is an image showing a result of determining a lane type in a device for determining lane type according to an exemplary embodiment of the present disclosure.

Referring to FIG. 3, a recognition result of an around view image acquired by the camera 110 includes a front image (a), a right side image (b), a left side image (c), and a rear image (d). The device for determining lane type 100 may recognize a scene through an around view image. That is, the device for determining lane type 100 may recognize whether the road on which the vehicle 10 is running is a highway or a downtown road through the road and other objects.

Referring to FIG. 4, a result of determining a lane type for an around view image includes a front image (a), a right side image (b), a left side image (c), and a rear image (d). The device for determining lane type 100 may determine the type of the lane detected from the recognized around view image. That is, the device for determining lane type 100 may determine the lane type based on the shape and color of the lane.

Hereinafter, a method for determining lane type of the present disclosure will be described with reference to FIGS. 5 and 6.

FIG. 5 is a flowchart of a method for determining lane type according to an exemplary embodiment of the present disclosure.

The method for determining lane type 200 includes steps of acquiring an image (S210), detecting lanes and road markings (S220 to S250), classifying lanes and road markings (S260 and S270), and confirming lane types (S280 and S290).

In more detail, as shown in FIG. 5, first, the device for determining lane type 100 acquires an around view image around the vehicle 10 by the camera 110 at step S210. In this case, the device for determining lane type 100 may acquire an around view image using the front camera 111, the right side camera 112, the left side camera 113, and the rear camera 114. Here, the camera 110 may be a fisheye camera.

Next, the device for determining lane type 100 recognizes a scene of the acquired around view image at step S220. In this case, the device for determining lane type 100 may be configured to detect a road and other object from the acquired around view image.

That is, the device for determining lane type 100 may detect an object capable of recognizing a road condition from the around view image. In this case, the device for determining lane type 100 may be configured to recognize whether the detected road is a highway or a downtown road according to the road and other object detected from the around view image.

Next, the device for determining lane type 100 determines whether a road is contained in the scene recognized from the around view image at step S230, and if the recognized scene does not contain a road, returns to step S210 to repeatedly perform acquiring an around view image and recognizing a scene.

As a result of the determination at step S230, if the recognized scene contains a road, the device for determining lane type 100 detects a road condition at step S240. In this case, the device for determining lane type 100 may detect the road condition by additionally detecting objects on the road.

For example, the device for determining lane type 100 may detect at least one of snow, water, fallen leaves, and mud on a road. That is, the device for determining lane type 100 may detect road surface condition on a road.

Next, the device for determining lane type 100 detects lanes and road markings from the recognized scene of the around view image at step S250. For example, the device for determining lane type 100 may detect lanes and road markings by edge detection.

Next, the device for determining lane type 100 determines whether the detected object is a lane of a road and a road marking at step S260 and if the detected object is not a lane and a road marking, returns to step S210 to repeatedly perform acquiring an around view image, recognizing a scene, and detecting a lane and a road marking.

As a result of the determination at step S260, if the detected object is a lane of a road and a road marking, the device for determining lane type 100 classifies lanes and road markings detected from the around view image at step S270. In this case, the device for determining lane type 100 may classify the detected lanes and road markings by the classifier 132 adapted based on GPS information, as described later with reference to FIG. 6.

For example, the device for determining lane type 100 may classify the lanes detected from the around view image into one of a dotted line, a solid line, and a combination thereof according to a shape thereof.

Next, the device for determining lane type 100 confirms a type of the classified lanes at step S280. In this case, the device for determining lane type 100 may search for a color of the lanes detected from the around view image.

As a result, the device for determining lane type 100 may determine the type of the corresponding lane according to the shape and color of the lane recognized from the around view image.

Next, the device for determining lane type 100 transmits a braking signal and an acceleration signal to the corresponding ECU 11 based on the confirmed type of lanes and road markings at step S290. Here, the ECU 11 may control autonomous driving of the vehicle 10.

Optionally, the device for determining lane type 100 may determine whether to maintain the braking signal and the acceleration signal based on the condition of the road.

FIG. 6 is a flowchart showing a procedure for adapting a classifier in a method for determining lane type according to an exemplary embodiment of the present disclosure.

The procedure for adapting the classifier 300 includes steps of receiving GPS information (S310) and adapting the classifier (S320).

In more detail, as shown in FIG. 6, first, the device for determining lane type 100 receives GPS information from a GPS satellite at step S310. Here, the GPS information may include topography and road information according to the current location of the vehicle 10.

Next, the device for determining lane type 100 adapts the classifier 132 based on the received GPS information at step S320. Here, the device for determining lane type 100 may receive input of the lane and road markings of the around view image detected from the step of detecting lanes and road markings (S250) in FIG. 5.

In this case, the device for determining lane type 100 may adapt the classifier 132 based on GPS information. In addition, the device for determining lane type 100 may provide a classifier 132 adapted to classify lanes and road markings to the step of classifying lanes and road markings (S270) in FIG. 5.

Such methods may be implemented by the device for determining lane type 100 as shown in FIG. 2, and in particular, may be implemented as a software program that performs such steps, wherein such a program may be stored on a computer-readable recording medium or transmitted by a computer data signal combined with a carrier wave in a transmission medium or a communication network. In this case, the computer-readable recording medium may include any kind of recording device in which data readable by a computer system is stored.

Although exemplary embodiments of the present disclosure have been described above, the spirit of the present disclosure is not limited to the embodiments set forth herein. Those of ordinary skill in the art who understand the spirit of the present disclosure may easily propose other embodiments through supplement, change, removal, addition, etc. of elements within the same spirit, but the embodiments will be also within the scope of the present disclosure.

What is claimed is:

1. A device for determining lane type, comprising:
a camera for acquiring an around view image around a vehicle;
a GPS receiver for receiving GPS information; and
a controller communicatively connected to the camera and the GPS receiver,
wherein the controller is configured to:
recognize a scene of the image acquired by the camera,
detect lanes and road markings from the recognized scene,
adapt a classifier, by autonomously determining a country and a region in which the vehicle is currently located, based on the GPS information and the detected lanes and road markings,
classify, by using the adapted classifier, the detected lanes and road markings, and
confirm a type of the classified lanes.

2. The device of claim 1, wherein the controller is configured to adapt the classifier based on the GPS information by inputting the detected lanes and road markings.

3. The device of claim 1, wherein the controller is configured to transmit a braking signal and an acceleration signal to a corresponding ECU based on the type of lanes and road markings.

4. The device of claim 1, wherein the controller is configured to search for a color of the detected lanes.

5. The device of claim 1, wherein the controller is configured to detect roads and other objects from the image.

6. The device of claim 5, wherein the controller is configured to recognize whether the road is a highway or a downtown road according to the detected roads and other objects.

7. The device of claim 5, wherein the controller is configured to:
determine whether a road is contained in the recognized scene, and
if the recognized scene contains a road, detect a condition of the road.

8. The device of claim 7, wherein the controller is configured to detect at least one of snow, water, fallen leaves, and mud on the road.

9. The device of claim 1, wherein the camera is a fisheye camera.

10. A method for determining lane type, comprising:
acquiring, by a camera, an around view image around a vehicle;
receiving by a GPS receiver, GPS information,
recognizing a scene of the acquired image;
detecting lanes and road markings from the recognized scene;
adapting a classifier, by autonomously determining a country and a region in which the vehicle is currently located, based on the GPS information and the detected lanes and road markings;
classifying, by using the adapted classifier, the detected lanes and road markings;
confirming a type of the classified lanes.

11. The method of claim 10, further comprising:
receiving GPS information; and
adapting the classifier based on the GPS information by inputting the detected lanes and road markings.

12. The method of claim 10, further comprising transmitting a braking signal and an acceleration signal to a corresponding ECU based on the type of lanes and road markings.

13. The method of claim 10, wherein the confirming the type of the lanes comprises searching for a color of the detected lanes.

14. The method of claim 10, wherein the recognizing the scene comprises detecting roads and other objects from the image.

15. The method of claim 14, wherein the recognizing the scene comprises recognizing whether the road is a highway or a downtown road according to the detected road and other objects.

16. The method of claim 14, further comprising:
determining whether a road is contained in the recognized scene; and
if the recognized scene contains a road, detecting a condition of the road.

17. The method of claim 16, wherein the detecting the condition of the road comprises detecting at least one of snow, water, fallen leaves, and mud on the road.

18. The method of claim 10, wherein the acquiring the image comprises acquiring the image by using a fisheye camera.

19. The device of claim 1,
wherein the controller is configured to classify, by using the adapted classifier, the detected lanes into one of a plurality of lane types, the plurality of lane types including a first lane type being a dotted line, a second lane type being a solid line, and third lane type being a combination of a dotted line and a solid line.

20. The method of claim 10,
wherein the detected lanes are classified, by using the adapted classifier, into one of a plurality of lane types, the plurality of lane types including a first lane type being a dotted line, a second lane type being a solid line, and third lane type being a combination of a dotted line and a solid line.

* * * * *